(12) United States Patent
McKeown

(10) Patent No.: US 6,670,965 B1
(45) Date of Patent: Dec. 30, 2003

(54) SINGLE-PASS WARPING ENGINE

(75) Inventor: Jack R. McKeown, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 435 days.

(21) Appl. No.: 09/675,822

(22) Filed: Sep. 29, 2000

(51) Int. Cl.[7] .................................................. G09G 5/00
(52) U.S. Cl. ........................ 345/660; 345/604; 345/645; 345/557; 345/558; 345/646; 345/647; 345/648; 345/667
(58) Field of Search ................................. 345/427, 604, 345/645, 557, 558, 418, 646, 647, 648, 660, 667

(56) References Cited

U.S. PATENT DOCUMENTS

| | | | |
|---|---|---|---|
| 5,204,944 A | 4/1993 | Wolberg et al. | |
| 5,398,117 A | * 3/1995 | Suzuki et al. | 358/451 |
| 5,568,600 A | 10/1996 | Kaba | |
| 5,977,977 A | * 11/1999 | Kajiya et al. | 345/418 |

* cited by examiner

*Primary Examiner*—Jeffery Brier
*Assistant Examiner*—Tam Tran
(74) *Attorney, Agent, or Firm*—Blakely, Sokoloff, Taylor & Zafman LLP

(57) ABSTRACT

A first scanline of an input image is spatially transformed into a first pixel sequence of an output image. Holes in the first sequence are interpolated if magnifying the input image. Overlapping pixels in the first sequence are adjusted if minifying the input image. After transforming the first scanline, a second scanline of the source image is transformed into a second pixel sequence of the output image. Holes in the second sequence are interpolated if magnifying the input image. Overlapping pixels in the second sequence are adjusted if minifying the input image. Overlapping pixels across the first and second sequences are adjusted and holes between the first and second sequences are interpolated if rotating the input image.

15 Claims, 5 Drawing Sheets

15 Degree Rotation

30 Degree Rotation

45 Degree Rotation

60 Degree Rotation

90 Degree Rotation

15 Degree Rotation With
Perspective Warp

Scaling: A. Sx = Sy = 1.5; B. Sx = Sy = 0.5

SINGLE-PASS WARPING ENGINE

BACKGROUND

This invention is generally related to digital image processing and more particularly to methodologies for warping an input image using affine and perspective transformations.

A digital image is an electronic representation of a scene using a collection of picture elements ("pixels"). In a two-dimensional (2-D) image, each pixel may be identified by a pair of numbers or "coordinates" written in the form (u,v) of a Cartesian coordinate system, and is assigned one or more intensity values for one or more colors (abbreviated here as "color values").

Spatial transformations, also referred to as warping, can transform an input, 2-D image into an output image, by scaling upwards or downwards, rotating, translating (moving), and/or shearing the input image. These transformations are known as affine transformations. Another type of spatial transform is a perspective transformation in which the image is transformed so that its edges converge to one or both axes of the output image's coordinate system.

Image warping is used to enhance image quality and correct images in a variety of different applications, including computer graphics, computer vision, medical imaging, and remote sensing. In addition, image-based modeling and rendering (IBMR), where three-dimensional (3-D) images are created from 2D images or photographs, makes extensive use of 2-D warping to transform several reference images and then composite them for a desired 3-D view. The use of IBMR in 3-D video applications, such as computer games and computer-animation, calls for fast warping, due to the fast image rendering required for depicting complex and rapidly changing scenes.

Warping may be viewed as a mapping of the input image coordinate system (u,v) into the coordinate system (x,y) of the output image. This may be depicted by a matrix equation $[x',y',w]^T = \text{matrix} W * [u,v,1]^T$ in which the coordinates (u,v) of a pixel in the input image are mapped to coordinates (x=x'/w, y=y'/w) by performing the matrix multiply operation and a perspective divide. The matrix W is a 3×3 matrix known as a concatenated warping matrix whose elements define the affine and perspective transformations.

Some scanline warping methodologies have been developed that operate only along rows and columns of the input image and one or more intermediate images, to exploit simplifications in digital filtering and memory access. See e.g. Catmull, Edwin and Alvy Ray Smith, "3-D Transformations of Images in Scanline Order," *Computer Graphics*, (SIGGRAPH '80 Proceedings), vol. 14, no. 3, pp. 279–285, July 1980. The latter is a "two-pass" technique in which the first pass through the input image applies a transform to each row to yield an intermediate result, and then a second pass applies another transform to each column of the intermediate result image to yield the output image.

Some of the problems with the two-pass technique referred to above include the provision of a special case for rotations of 90 degrees (due to a singularity in the transform applied in the first pass). This makes the technique more complicated in a hardware-only implementation. In addition, the two passes through the input and intermediate images may not be the most efficient way to utilize hardware parallelism. Finally, reconstruction of aliasing holes require yet another pass through the output image, thereby further increasing the time needed to warp the input image.

BRIEF DESCRIPTION OF THE DRAWINGS

The invention is illustrated by way of example and not by way of limitation in the figures of the accompanying drawings in which like references indicate similar elements. It should be noted that references to "an" embodiment in this disclosure are not necessarily to the same embodiment, and they mean at least one.

DETAILED DESCRIPTION

Figure 1:
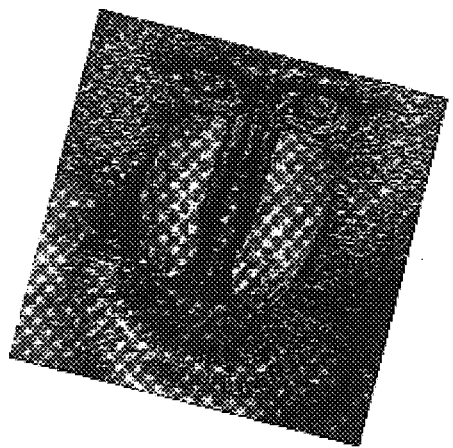
FIGS. 1–7 show various examples of warping that can be accomplished by a single-pass warping engine.

An embodiment of the invention is directed to a digital image warping methodology that avoids the singularities of the two-pass warping technique described above. In addition, the warping methodology executes in a single pass of the input image and it performs any needed image reconstruction simultaneously in the single pass, to yield the output image without any aliasing holes. The methodology may prove to be particularly effective in hardware-only implementations, which provide a greater speed of execution than software being executed by a general purpose processor. Examples of warping that can be accomplished by the methodology are shown in FIGS. 1–7 which are based upon a square, upright image of a mandrill.

An embodiment of the warping methodology will be described with reference to FIG. 8 in which an input image 104 is made up of an array of input pixels 110 that are identified by their (u,v) coordinates in the u-v coordinate system. An output image 108 from a warping transformation is defined as having an array of pixels where each pixel is identified by a pair of coordinates (x, y) in the x-y coordinate system. Each input pixel 110 of the input image 104 is defined as having color values $P_1$ (U,V), $P_2$ (U,V) ... where (U,V) identifies the input pixel 110 by its location. This input pixel 110 is then warped into an output pixel 112 which has the same color values as the input pixel 110 but at different coordinates (X,Y).

Figure 8:
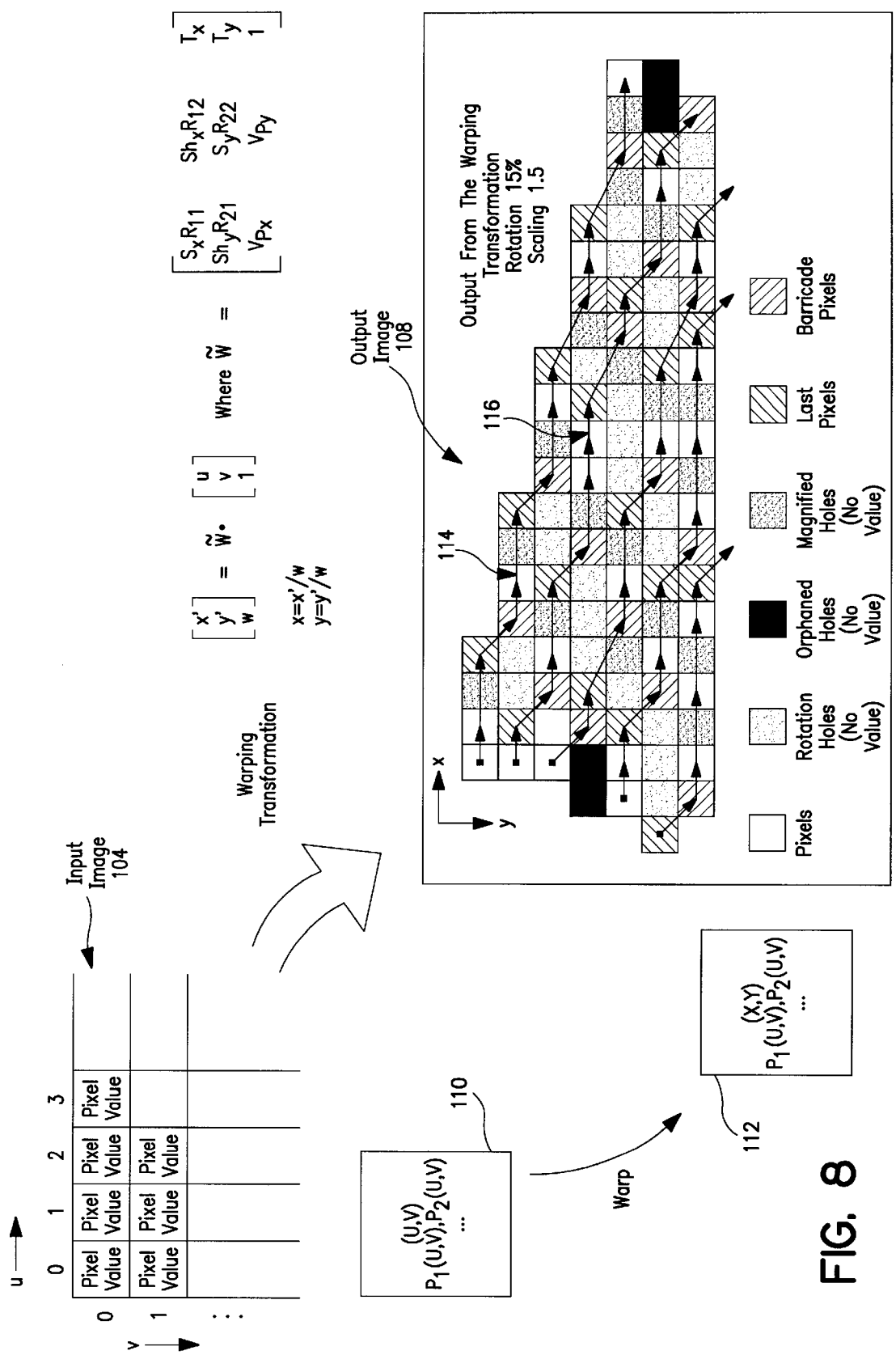
FIG. 8 shows sections of the input and output images during an embodiment of a single-pass warping process.
Figure 9:
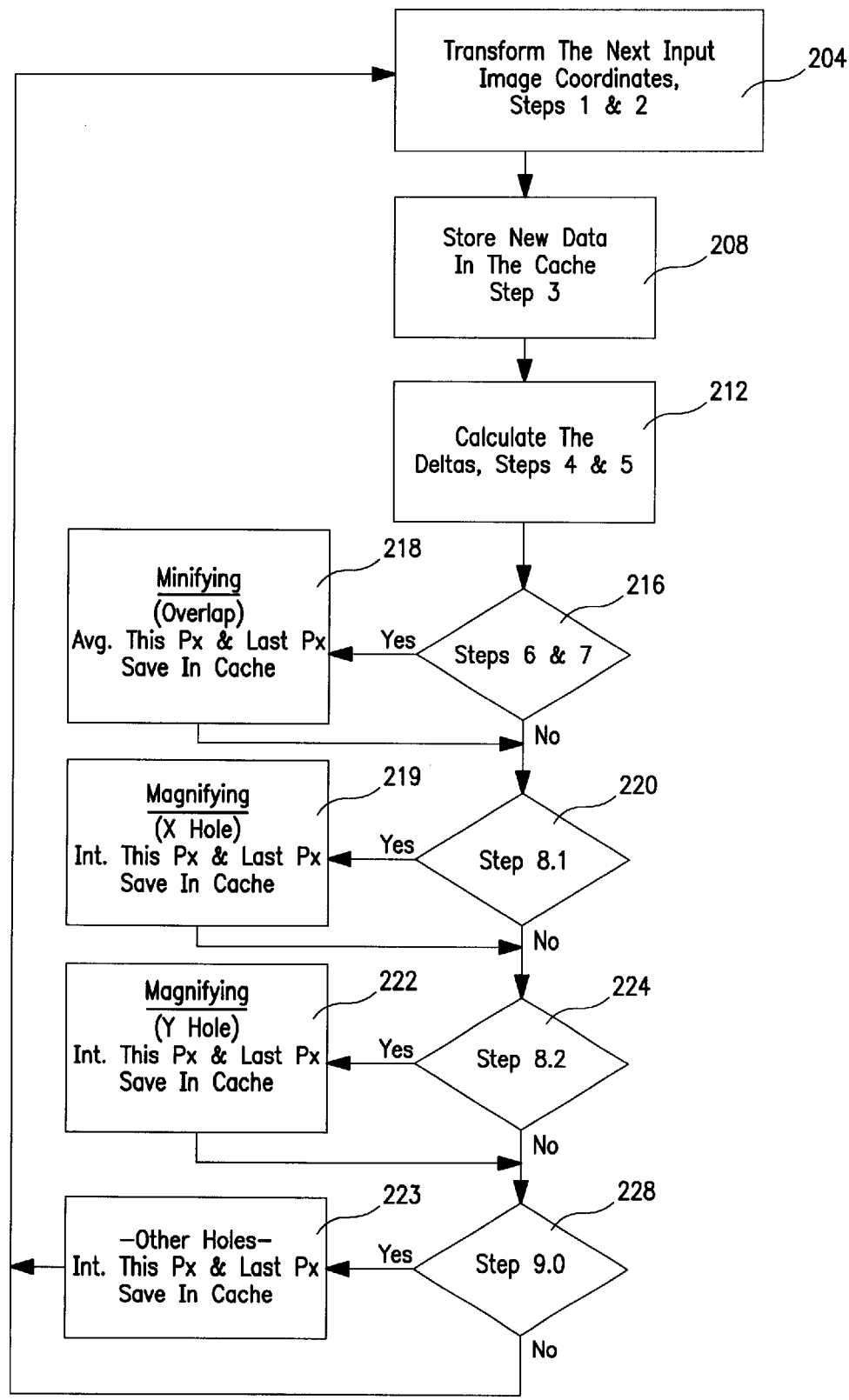
FIG. 9 illustrates a flow diagram of operations in an embodiment of the warping process.

The general form of the warping matrix W is given in FIG. 8 as a nine element 3×3 matrix. $R_{11}$–$R_{22}$ are rotation parameters (where $R_{11}$=cos θ, $R_{12}$=–sin θ, $R_{21}$=sin θ $R_{22}$= cos θ) and, $S_x$ and $S_y$ are scaling parameters in the x and y directions, respectively, $Sh_x$ and $Sh_y$ are shear parameters in the x and y directions, respectively, $T_x$ and $T_y$ are translation parameters, and $Vp_x$ and $Vp_y$ are vanishing points for the perspective transformation. Aliasing artifacts may appear in the output image 108 following a warping transformation, because, in general, the transformation is not a one-to-one mapping in image space. Such artifacts may be caused by, for instance, transforming a square input pixel into a rectangular one. Artifacts may also occur due to overlapping pixels. One type of overlapping occurs when the image is folding over itself, where the warping transformation has resulted in two pixels occupying the same space. The warping functions of minification, scaling downwards by less than 1, and rotation often produce overlapping pixels.

Yet another type of aliasing occurs when magnifying or scaling an image upwards and rotating the image. These transformations produce "holes", i.e. pixel locations to which no input pixels have been mapped by the warping transformation, in the output image. These holes can be filled by linear or bilinear interpolation of the neighboring pixels to have an acceptable quality output image.

According to an embodiment of the invention, the single pass warping methodology begins with the upper left most pixel at (u=0, v=0), and proceeds from left to right until each scanline (in this example, row) of the input image 104 has been processed, and then moves to the next immediately adjacent scanline. Each transformed scanline is called a 'pixel sequence'. For example, scanlines v=0 and v=1 are transformed into sequences 114 and 116, respectively.

Each pixel 110 of the input image 104 is processed by being multiplied by a warping transformation matrix W, resulting in a new set of coordinates, (x,y). Thus, it can be seen that input pixels at (u=0, v=0) and (u=1, v=0) are translated into adjacent pixels beginning at the upper left hand corner of the output image 108. However, the scanline's third input pixel at (u=2, v=0) is transformed into a pixel which is not adjacent to the previously transformed one at (u=1, v=0). The empty location between the transformed (1,0) and (2,0) input pixels is known as a hole that has no color value. The distinction between holes (pixels with no mapped color values) and transformed pixels in FIG. 8 is made by the absence and presence, respectively, of a right-pointing triangle in the pixel location.

Magnified holes may be a result of magnification in the warping matrix, i.e. $S_x>1$ and/or $S_y>1$. Such a hole may be filled, e.g. interpolated, based upon the color values of the neighboring pixels of the output image 108.

A pixel sequence may skip a hole not only in the x direction but also in the y direction. Thus, the first scanline 114 is shown as stepping in the y direction at the fourth pixel of the scanline, namely input pixel (u=3, v=0). The resulting output pixel lies in the second row of the output image. This transition to a different row is termed a "barricade" pixel. The output pixel that is immediately prior to the barricade pixel is termed a "previous" or "last" pixel. This stepping of the transformed pixel sequence in the y direction may create holes in the rows of the output image 108 that contain the last pixel and the barricade pixel. These holes may be due to rotation in the warping transformation, such that they are termed rotation holes in FIG. 8. The rotation may also cause holes in the same row as the last pixel beyond which there are no transformed pixels in the same row. These holes are termed orphaned holes. To provide an acceptable image quality, all holes resulting from the warping transformation, including rotation holes, orphaned holes, and magnified holes, are to be filled. However, unlike the two-pass technique described above in the Background section, the filling of these holes occurs, in a particular embodiment of the invention, simultaneously with the transformation in scanline order, such that all of the pixels in the output image are defined following a single pass through the input image 104.

FIG. 8 shows a number of pixel sequences, including references 114 and 116 as well as others successive thereto, which are in effect transformed scanlines (here, rows) from the input image 104. The warping transformation responsible for producing such pixel sequences included a rotation of 15 degrees and a magnification of 1.5. What is not shown therefore is the effect of a warping transformation that includes minification. In that case, it may be expected that the transformed scanlines behave differently than shown in FIG. 8 such that certain pixels of the transformed scanline overlap, i.e. have the same (x,y) coordinates as previously transformed pixels of the same scanline. In that case, the overlapping pixels need to be adjusted, such as by performing a weighted average as further described below, to yield an output image of acceptable quality.

In another scenario not shown in FIG. 8, overlapping pixels may appear across two transformed scanlines if, for instance, the image is rotated and strongly magnified. In that case, certain pixels of a transformed scanline will overlap pixels previously computed for one or more previously transformed scanlines. Once again, these overlapping pixels need to be addressed by being adjusted according to various mathematical formulas.

As mentioned above, the scanning of the array of pixels in the input image 104 may start at u=0, v=0, and the input coordinates are transformed one at a time until reaching the last pixel at uRes−1 and vRes−1, by incrementing column and row indeces in scanline order. Variables uRes and vRes are the maximum u and v resolutions of the input image, respectively. The remaining operations in an embodiment of the warping methodology are now described, using reference numerals as follows.

1. The scanline processing of the input image may be implemented, for instance, using two embedded "for" statements in the C programming language as:

```
for (int row=0; row<pReg->SrcHeight; row++)
{
    for (int column=); column <pReg->SrcWidth; column++)
        // pReg → SrcHeight is a pointer to a register called
SrcHeight
        // which contains the vertical resolution of the input
image
    {
        // Transform each pixel[U,V]. . . via the warping matrix
        //   pixel[X',Y',W]ᵀ = W * pixel[column, row,1]ᵀ
        //   pixel[X,Y] = pixel[X'/W,Y'/W]
        .
        {column processing}
        .
        // The last three expressions of this loop are:
        lastPixel.x = thisPixel.x;
        lastYperPixel = thisPixel.y;
        lastPixel.Color = thisPixel.Color;
    }
    .
    {row processing}
    .
    // The last expressions in this loop are:
    lastYperScanline = thisPixel.x;
    lastYperPixel = thisPixel.y;
    maskIndex = (maskIndex+1) %2;
}
```

2. Inside the loops of the for—statements above, the vector equation shown in FIG. 8 is calculated to spatially transform each input pixel into the coordinates (x,y) of the output pixel. As mentioned above, this warping transformation may result in holes for which no input pixels have been mapped, such that these holes have no color values. Thus, some of the remaining operations of the methodology determine where the holes and overlapping pixels are located, while moving along each scanline. Once the coordinates of these holes are known, the methodology, for instance, linearly or bilinearly interpolates the pixel colors to fill a hole. If an overlapping pixel has been located, the methodology, according to one embodiment, averages the overlapped pixels.

3. The transformed scanlines (or sequences) are stored in cache memory. Thus, a new cache address is computed as:

cacheAddress=CacheBias+row*pReg->SrcWidth+column; (8)

Each newly transformed pixel is stored in the cache using the variable thisPixel, i.e. the current pixel in the sequence;

Cache[cacheAddress]=thisPixel; (9)

A mask array for the current transformed sequence is created. The pixel mask for this pixel is then set to one, mask[index][(int) thisPixel.x], indicating that this pixel is filled with color values.

4. Variables that represent changes in the x and y coordinates are calculated based upon the location of the current pixel (thisPixel[X,Y]) and the last pixel (lastPixel[X,Y]) of the current transformed scanline (see FIG. 8, where green represents last pixels):

$$deltaX = abs\ ((int)\ thisPixel.x - (int)lastPixel.x); \quad (10)$$

$$deltaYperPixel = abs\ ((int)\ thisPixel.y - (int)\ lastYperPixel); \quad (11)$$

The absolute value function applied to the x coordinate prevents negative values of deltaX when the x coordinate wraps around to the beginning locations of the next row (such as when deltaX=-$S_x$*cos θ*pReg->SrcWidth). The variable deltaYperPixel will normally be zero if the transformed scanline stays along one row in the x-y coordinate system. However, when there is rotation or foreshortening as in a perspective effect, this variable may occasionally have a value greater than zero which, as stated above, may result in rotation holes as well as orphaned holes in the output image 108.

5. A variable representing the change in the y direction from the last transformed scanline is then computed. This represents a change in the y coordinate of the current pixel as compared to a last pixel in a previous transformed scanline:

$$deltaYperScanline = (int)\ thisPixel.y - (int)\ lastYperScanline; \quad (12)$$

The variable lastYperScanline is set to the last value of y, at the beginning of each row of the output image 108. This is because the processing of the input pixels is occurring in scanline order and the defined change in the y coordinate of an output pixel may be greater than one if there is magnification in the y axis.

6. If both deltaX and deltaYperPixel are zero, the current pixel is overlapping the last pixel. In that case, a weighted linear interpolation may be performed between thispixel.color and lastPixel.color. For instance, the weight used may be 0.5 which results in taking the average of the color values of the current pixel and the previous pixel.

7. If (mask[lastMask][Dst.V.x]==1) then a pixel "collision" has occurred in which the location of the current output pixel in the current transformed scanline overlaps with that of an output pixel in a previous transformed scanline. To address this situation, a two scanline pixel mask is created, in which a bit is set for each pixel that has been assigned a color value, and a bit is cleared everywhere else. The overlapping pixel's cache address is computed and its coordinates are fetched. If the Y values of the pixel in cachePixel.V.y and this pixel.V.y match, i.e. the overlapping pixels are in the same row, a weighted linear interpolation is performed between the cached pixel's color values and the current pixel's color values, for instance using a weight value of 0.5 which corresponds to a simple averaging.

8. Image magnification occurs when the scaling parameters of the warping matrix are greater than one, i.e. $S_x$>1.0 and/or $S_y$>1.0.

8.1 If ((deltaX>1) and (deltaX≦⌈$S_x$⌉)) where the symbol ⌈ ⌉ represents a rounding up to the nearest integer, then fill the hole with a linear weighted average between the color values of the last pixel in the same row of the output image as the current pixel.

8.2 If ((deltaYperScanline>1) and (deltaYperScanline≦⌈Sy⌉), fill the hole with a linear weighted average between the color values of the last vertical pixel and that of the current pixel.

8.3 If both 8.1 and 8.2 are true, then fill the hole with a bilinear weighted average between the color value of the last pixel and that of the current pixel.

9. If the variable deltaYperPixel is greater than zero and less than ⌈Sy⌉, than the rest of the row in the output image may be "blocked" from this position to the end of the transformed scanline. In such a situation, a copy of the current pixel's color values and coordinates are pushed into a first in first out (FIFO) buffer where it can be retrieved at a later time when processing the next scanline. This pushing of barricade pixels onto the FIFO buffer continues along the scanline whenever deltaYperPixel is greater than zero.

In addition, while proceeding along the scanline, if deltaYperPixel is greater than zero, a previously pushed barricade pixel is popped from the FIFO buffer. This popped barricade pixel would normally be from a previous transformed scanline; if the Y coordinate of the popped barricade pixel matches the Y coordinate of the current transformed scanline, as determined from the Y value of the last pixel in the current transformed scanline, this indicates the presence of holes between the popped barricade and the last pixel in the current transformed scanline that are in the same row of the output image.

9.1 In a particular embodiment, the barricade pixel which has been popped from the FIFO buffer is verified to determine whether its Y coordinate matches that of the current pixel. If not, the Y coordinate of the popped barricade is compared to that of the last pixel, i.e. the previous pixel in the current transformed scanline. If there is still no match, the barricade pixel is discarded.

9.2 If there is a match in the Y coordinate with either the current pixel or the last pixel, a fragment length is computed. For instance, if the match is with the last pixel, then the fragment length is given by $$fragmentLength = Barricade.x - lastPixel.x. \quad (13)$$

This fragment length is then used as a limit on an index for interpolating pixels between the last pixel and the barricade pixel that has just been popped from the FIFO buffer. In a particular embodiment, a weighted linear interpolator needs a pixel weight to fill the holes. Thus, for instance, $$weight = index/fragmentLength. \quad (14)$$

The hole color is then given by hole.color=LinearInterpolation (thisPixel.color, lastPixel.color, weight)

where the function LinearInterpolation (thisPixel.color, lastPixel.color, weight) may be defined according to known interpolation schemes. In addition, the coordinates of the hole are calculated as follows:

$$hole.x = Barricade.x - index \quad (15)$$

$$hole.y = lastPixelt.y \quad (16)$$

With the above information, not only can the hole be identified, but also its color values can be determined.

A special area of cache memory may be dedicated for filling holes in the output image as follows:

ExtraCacheAddress=pReg->CacheBaseAddress+pReg->SrcHeight*pReg->SrcWidth; Cache[ExtraCacheAddress]=hole (17)

Once the hole has been identified and filled in this manner, the pixel mask for the hole is set, i.e. mask[index][(int) thisPixel.x]=1.

If there are remaining pixels to be transformed in the input image 104, then the appropriate indices are incremented, the pixel mask is reset to zero for the currently transformed scanline, and steps 2–10 above are executed for the next pixel of the scanline in the input image 104. On the other hand, if the filled hole was the last pixel in the transformed scanline, then the contents of the cache which include the transformed scanline and the filled holes, are transferred into an output buffer for further processing. Thus, the entire input image is processed in this manner in scanline order, where each transformed scanline including its filled holes and those between it and a previous scanline are transferred to an output buffer, before the next scanline is processed, to generate the entire output image one scanline portion at a time.

Figure 2:
Figure 3:
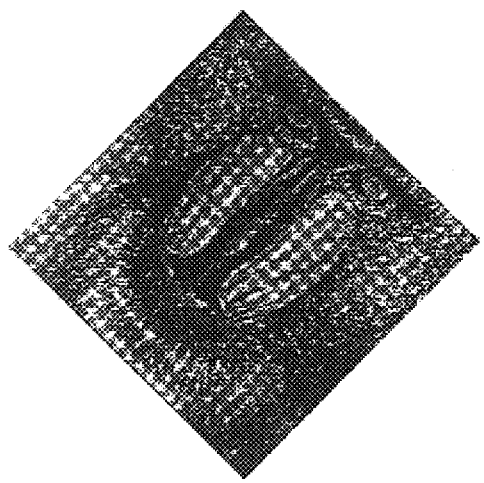
Figure 4:
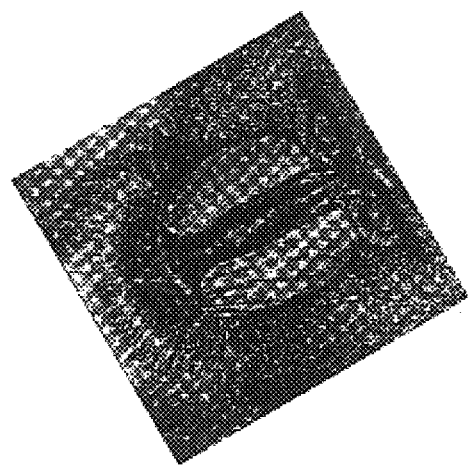
Figure 5:
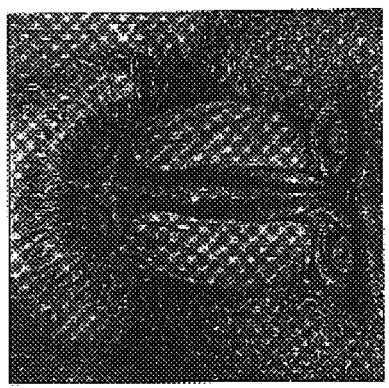
Figure 6:
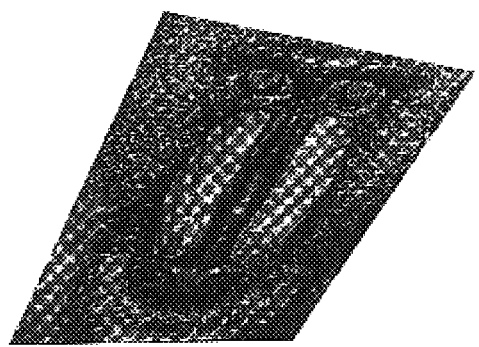
Figure 7:
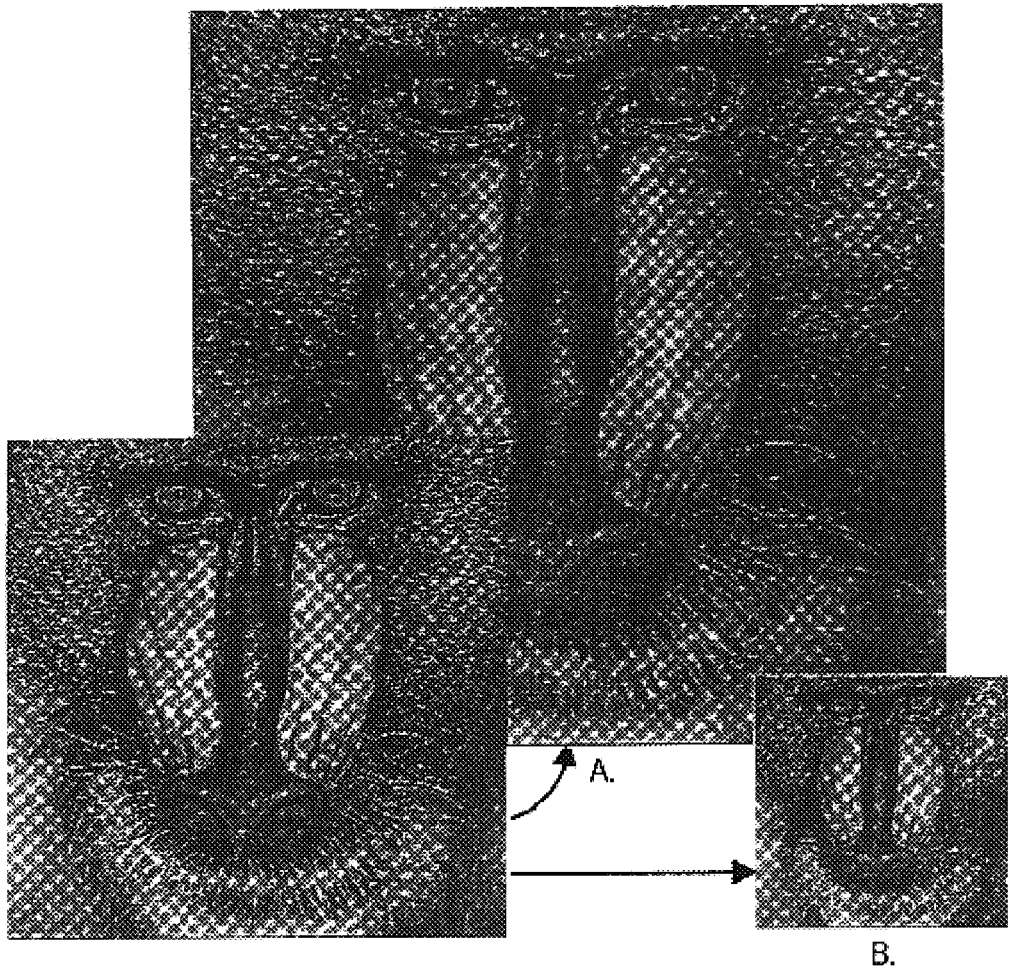

FIG. 2 illustrates a flow diagram for an embodiment of the single pass warping methodology. Operation begins as indicated in block 204 in which the coordinates of the next pixel in a scanline of the input image are fetched and transformed, according to steps 1 and 2 described above. The flow then proceeds with block 208 in which the coordinates of the transformed pixel and its color values are stored in cache memory, as in step 3 described above. This is followed by the operations of block 212 in which deltaX and deltaY are computed according to steps 4 and 5. A decision block 216 is then reached where deltaX and deltaY per pixel are evaluated to determine whether there are any overlapping pixels, according to steps 6 and 7. If there are, these are more likely than not minify overlap pixels which may be then averaged and saved in an external or separate cache memory area, as in operation 218. Operation continues with another decision block 220 in which horizontally oriented holes are detected, as in step 8.1. These holes may be caused by image magnification and may be filled, as in operation 219, by interpolating with the last pixel and saving the interpolated color values and coordinates of the hole in a separate area of the cache memory.

A further decision block 224 determines whether the change in the Y coordinate of this pixel as compared to a previous scanline is greater than 1, which means that holes between the current transformed scanline and a previous transformed scanline have been detected, as provided, for instance, by step 8.2 described above. If so, then these holes, which may also be caused by image magnification, are interpolated as in operation 222 using for instance linear weighted averaging of this pixel and a last pixel in the previous transformed scanline. Once again, the interpolated color values and location of the filled hole are saved in cache memory.

The decision block 228 detects holes that are in the same row as a last pixel of the current transformed scanline, in response to a change in the Y coordinate of the current pixel, according to step 9. After popping a barricade pixel from the barricade FIFO, these holes, which may be caused by a rotation, are filled in accordance with steps 9.2, 9.3, and 9.4 described above and as referenced in operation 223. The methodology then loops back to fetch the coordinates of the next input pixel of the scanline and resumes operation at block 204.

Figure 10:
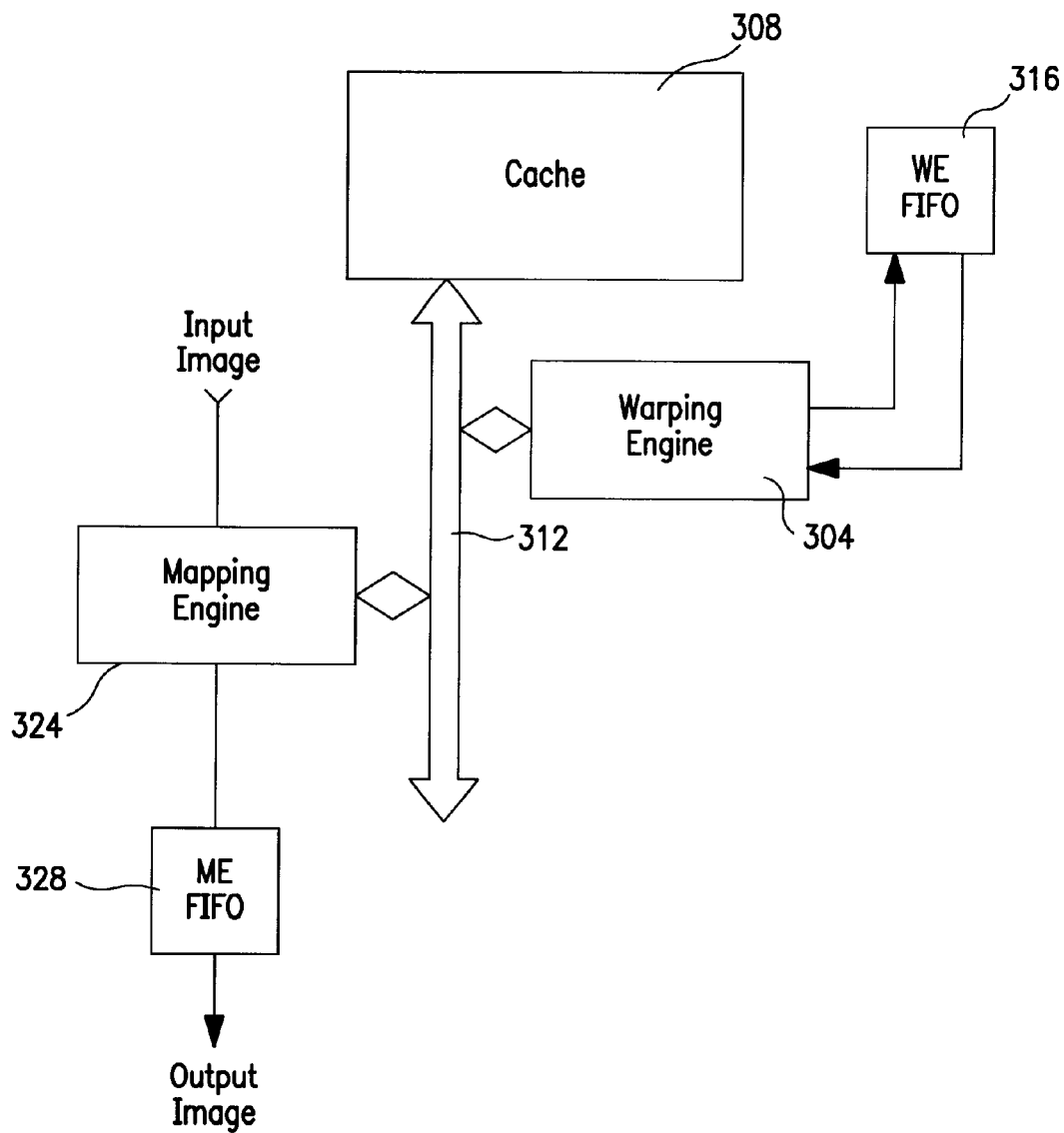
FIG. 10 depicts a hardware block diagram of an embodiment of an image processor that contains the warping engine.

FIG. 10 illustrates an exemplary hardware architecture that may be used for supporting image-based rendering. The logic circuitry includes a warping engine 304 which may be configured to perform the scanline order operations described above for warping an input image into an output image. The warping engine 304 includes a number of functional units (not shown) including hole detection logic, overlap detection logic, adjusting logic, and interpolation logic, all designed to perform the operations described above for an embodiment of the single-pass warping methodology. An alternative implementation would be software-based, with instructions that are stored in a wide range of machine-readable media (including solid state memories, magnetic, and optical disks) and which, when executed by a processor, cause any one of the above-described embodiments of the single-pass warping methodology to be performed. A warping engine FIFO 316 is provided to allow fast access to the pixel sequences (transformed scanlines) by the warping engine 304. The warping engine 304 has a separate path to the cache memory 308 via a bus 312. The input image is initially obtained, from either a sensor or other source for image data (not shown) by a mapping engine 324 which controls the imaging tasks of the different hardware modules. The transformed scanlines that are stored in the cache 308 are read by the mapping engine 324 and provided as an output via the mapping engine FIFO 328. The mapping engine 324 may also be coupled to control a geometry pipeline (not shown) that contains a texture processor module which may be given access to the cache bus 312, for texturing the warped images on to some arbitrary surface.

Various embodiments of the invention have been described that are directed to an improved technique for performing a digital warping transformation. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   (a) spatially transforming a first scanline of an input image into a first pixel sequence of an output image, interpolating holes in the first sequence if magnifying the input image, and adjusting overlapping pixels in the first sequence if minifying the input image; and
   (b) after transforming the first scanline, transforming a second scanline of the input image into a second pixel sequence of the output image, interpolating holes in the second sequence if magnifying the input image, adjusting overlapping pixels in the second sequence if minifying the input image, and adjusting overlapping pixels across the first and second sequences and interpolating holes between the first and second sequences if rotating the input image.

2. The method of claim 1 further comprising:
   after transforming the second scanline, transforming a third scanline of the input image into a third pixel sequence of the output image, interpolating holes in the third sequence if magnifying the input image, adjusting overlapping pixels in the third sequence if minifying the input image, and adjusting overlapping pixels across the second and third sequences and interpolating holes between the second and third sequences if rotating the input image.

3. The method of claim 1 further comprising:
   after transforming the second scanline, processing the entire input image in scanline order, by repeating (b) for successive scanlines of the input image, to generate the entire output image.

4. The method of claim 1 wherein the spatially transforming includes multiplying a position vector $[u,v,1]^T$ for each pixel of the first scanline by the same 3×3 warping matrix to obtain a position vector $[x=x'/w, y=y'/w, 1]^T$ for a corresponding pixel of the first sequence.

5. The method of claim 1 further comprising:
(1) pushing output image coordinates and a color value of a current pixel of the second sequence into a first-in-first-out (FIFO) buffer and (2) popping output image coordinates and a color value of a barricade pixel from the FIFO buffer, if the current pixel is in a different row than a previous pixel of the second sequence, and wherein interpolating holes between the first and second sequences includes interpolating one or more holes that are (1) in the same row, and (2) between the previous pixel and the barricade pixel.

6. A system comprising:
a warping engine to spatially transform a scanline of an input image represented in an input coordinate system, into a pixel sequence of an output image represented in coordinate system; and a first buffer to store coordinates and color values of the pixel sequence, wherein the warping engine further includes first hole detection logic coupled to the first buffer to detect holes in the pixel sequence, first interpolation logic coupled to the first hole detection logic, to interpolate holes detected in the sequence, first overlap detection logic coupled to the first buffer to detect overlapping pixels in the sequence, first adjusting logic coupled to the overlap detection logic, and the first buffer, to adjust overlapping pixels in the first sequence, second overlap detection logic coupled to the first buffer, to detect whether a pixel of a first sequence that is stored in the buffer overlaps a pixel of a second sequence, the second sequence to be generated after a first scanline is completely transformed into the first sequence, second adjusting logic coupled to the second overlap detection logic and the first buffer, to adjust a pixel of the first sequence that overlaps with a pixel of the second sequence, second hole detection logic coupled to the first buffer, to detect holes in the output image between the first and second sequences, and second interpolation logic coupled to the second hole detection logic to interpolate detected holes between the first and second sequences.

7. The system of claim 6 further comprising a cache memory, the first buffer being implemented in the cache memory, the cache memory being coupled to the first and second interpolation logic to store color values and coordinates of all of the detected and interpolated holes.

8. The system of claim 7 wherein the cache memory is further configured with a mask structure to indicate whether the color value of any of the pixels in the first and second sequence has or has not been determined, the second overlap detection logic is to read the mask structure to determine whether a pixel of the first sequence overlaps a pixel of the second sequence.

9. The system of claim 7 wherein the cache memory is further configured with a FIFO buffer to store a color value and coordinates of one or more barricade pixels in the first sequence, the barricade pixel being located in a different row of the output image.

10. The system of claim 9 wherein the second hole detection logic is coupled to pop the coordinates and color value of a previously stored barricade pixel from the FIFO buffer in response to the barricade pixel being computed, to identify the coordinates of holes in the same row between a previous pixel of the first sequence and the popped barricade pixel.

11. An article of manufacture comprising:
a machine-readable medium having a plurality of instructions stored therein which, when executed by a processor, cause
(a) a first scanline of an input image represented in an input coordinate system to be spatially transformed into a first pixel sequence of an output image represented in an output coordinate system, holes in the first sequence to be interpolated if magnifying, and overlapping pixels in the first sequence to be adjusted if minifying; and
(b) after the first scanline has been transformed, a second scanline of the input image to be transformed into a second pixel sequence of the output image, holes in the second sequence to be interpolated if magnifying, overlapping pixels in the second sequence to be adjusted if minifying, and overlapping pixels across the first and second sequences to be adjusted and holes between the first and second sequences to be interpolated if rotating.

12. The article of manufacture of claim 11 wherein the medium includes further instructions which, when executed by the processor, cause after the second scanline has been transformed, a third scanline of the input image to be transformed into a third pixel sequence of the output image, holes in the third sequence to be interpolated if magnifying, overlapping pixels in the third sequence to be adjusted if minifying, and overlapping pixels across the second and third sequences to be adjusted and holes between the second and third sequences to be interpolated if rotating.

13. The article of manufacture of claim 11 wherein the medium includes further instructions which, when executed by the processor, cause after the second scanline has been transformed, the entire output image to be processed in scanline order, by repeating (b) for successive scanlines of the input image, to generate the entire output image.

14. The article of manufacture of claim 11 wherein the instructions, when executed by the processor, cause the spatial transformation to include multiplying a position vector $[u,v,1]^T$ for each pixel of the first scanline by the same 3×3 warping matrix to obtain a position vector $[x=x'/w, y=y'/w, 1]^T$ for a corresponding pixel of the first sequence.

15. The article of manufacture of claim 11 wherein the medium includes further instructions which, when executed by the processor, cause (1) image coordinates and color values of a current pixel of the second sequence to be pushed into a first-in-first-out (FIFO) buffer and (2) image coordinates and color values of a barricade pixel to be popped from the FIFO buffer, if the current pixel is in a different row than a previous pixel of the second sequence, and wherein the instructions cause the interpolation of holes between the first and-second sequences to include interpolating one or more holes that are (1) in the same row, and (2) between the previous pixel and the barricade pixel.

* * * * *